United States Patent
Alvarez et al.

[11] Patent Number: 5,805,667
[45] Date of Patent: Sep. 8, 1998

[54] APPARATUS FOR RANGE-TESTING CORDLESS COMMUNICATION DEVICES AND METHOD OF OPERATION THEREOF

[75] Inventors: Luis M. Alvarez; Raimondo P. Sessego, both of Shreveport, La.

[73] Assignee: Lucent Technologies Inc., Murray Hill, N.J.

[21] Appl. No.: 775,912

[22] Filed: Jan. 2, 1997

[51] Int. Cl.⁶ .............................. H04M 1/24; H04B 17/00
[52] U.S. Cl. .............................. 379/1; 455/67.2; 455/425; 324/501
[58] Field of Search ..................... 379/1, 6, 27, 29, 379/30, 32, 21; 455/67.1, 67.2, 67.3, 67.4, 67.7, 421, 423, 425, 463; 324/501, 555, 537, 750, 543; 342/165, 169; 375/224, 227, 228; 370/241, 242, 256, 251, 252

[56] References Cited

U.S. PATENT DOCUMENTS 3,290,598  12/1966  Thomas ................................. 455/67.2
4,603,325  7/1986  Marino et al. ......................... 455/67.7
5,539,803  7/1996  Bhat et al. ............................ 379/21

*Primary Examiner*—Paul Loomis

[57] ABSTRACT

An apparatus for, and method of, range-testing a cordless communication device. The device has a first portion adapted to communicate with a second portion via a signal carried on a wireless channel, the signal subject to attenuation as a function of a distance separating the first and second portions. The apparatus includes: (1) an anechoic chamber for containing the first portion and substantially electromagnetically isolating the first portion from the second portion, (2) a wire for carrying the signal between the first and second portions, one end of the wire locateable within the anechoic chamber proximate the first portion and an opposite end of the wire locateable proximate the second portion and (3) a signal modification circuit, associated with the wire, for changing an amplitude of the signal by a selectable quantity, the signal modification circuit simulating the distance between the first and second portions thereby to allow the cordless communication device to be range-tested without actually varying the distance.

20 Claims, 3 Drawing Sheets

APPARATUS FOR RANGE-TESTING CORDLESS COMMUNICATION DEVICES AND METHOD OF OPERATION THEREOF

TECHNICAL FIELD OF THE INVENTION

The present invention is directed, in general, to wireless communications systems and, more specifically, to an apparatus for range-testing cordless communication devices and a method of operation thereof.

BACKGROUND OF THE INVENTION

Cordless telephones consisting of a handset and a base that communicate via a radio link are used pervasively in society. Their popularity stems from the ability of a caller to roam freely about the home or office while using the cordless phone. When first introduced, the base and the handset communicated using relatively simple transceivers that transmitted and received analog RF signals. These transceivers operated in a limited number of channels in the frequency band between 49 MHZ and 50 MHZ.

More recently, digital cordless telephones have been introduced that transmit and receive digital RF signals in the 900–938 MHZ frequency band (hereafter, the 900 MHZ band). The higher frequency range and the use of spread spectrum techniques enable digital cordless telephones to transmit a clearer signal over greater distances than the older analog cordless telephones. The quality of the signal is further enhanced by the use of a digital pulse train, rather than an analog signal.

As a result of the widespread use of cordless telephones, greater emphasis has been placed on mass testing handsets and bases more quickly and more accurately. The principal method used to test handsets and bases has been to physically separate the two units, thereby increasing the attenuation of the electromagnetic signal path separating the two units, and then to measure the quality of the signal received by each unit. This stems from the fact that most cordless phones, whether digital or analog, are sold in "matched pairs," i.e., a handset and a base are encoded at the factory to transmit and receive on a specified set of channels for security reasons and also to permit the use of more than one cordless telephone in a given geographic area. This encoding is independent of any "scrambling" of the voice signal that may also be done during transmission. In the case of a digital cordless phone, for example, the handset and the base will frequency hop in synchronization, in a specified frequency pattern, according to the data encoded in both units at the factory. This protects a caller by preventing someone else from using another handset to eavesdrop or to place outgoing calls free of charge on the caller's telephone line. As a result, the handset and the base must be tested together, since other handsets and bases, or even adaptable test fixtures that simulate handsets and/or bases, will not be encoded with the same information.

This method of testing cordless telephones (i.e., increasing path attenuation by physically separating the handset and base, and then measuring signal quality) is unusually laborious. The handset and base of a digital cordless phone operating in the 900 MHZ band may need to be separated by many hundreds of feet before the signal quality degrades sufficiently to cause loss of communications between the handset and the base. Furthermore, testing handsets and bases in a factory environment where many other handsets and bases are also being tested creates interference problems due to multipath and radio obstructions. Such an environment differs significantly from the average home or office environment, and makes the testing method inherently less reliable.

Accordingly, there is a need in the art for systems and methods for testing cordless phones that eliminate the need to physically separate the handset and the base. There is a still further need for systems and methods for testing cordless telephones that provide electromagnetic isolation for the handset and base in order to eliminate multipath and other sources of interference.

SUMMARY OF THE INVENTION

To address the above-discussed deficiencies of the prior art, the present invention provides an apparatus for, and method of, range-testing a cordless communication device. The device has a first portion adapted to communicate with a second portion via a signal carried on a wireless channel, the signal subject to attenuation over an electromagnetic signal propagation path separating the first and second portions. The apparatus includes: (1) an anechoic chamber for containing the first portion and substantially electromagnetically isolating the first portion from the second portion, (2) a wire for carrying the signal between the first and second portions, one end of the wire locateable within the anechoic chamber proximate the first portion and an opposite end of the wire locateable proximate the second portion and (3) a signal modification circuit, associated with the wire, for changing an amplitude of the signal by a selectable quantity, the signal modification circuit simulating attenuation of an electromagnetic signal propagation path as a function of distance so as to allow the cordless communication device to be range-tested without actually varying the distance between the first and second portion.

The present invention therefore introduces a distance-simulator that simulates the effects of physically separating first and second portions of a cordless communication device (such as a cordless telephone) by various distances to allow range-testing of the device. By foregoing the need actually to vary the distance between the portions of the device, time and money are saved and range-testing results tend to be more accurate.

In one embodiment of the present invention, the first portion is a base portion adapted to be coupled to a wire-based telecommunication system. Alternatively, the base portion can act as a wireless repeater.

In one embodiment of the present invention, the one and opposite ends of the wire are coupled to first and second antennae for communicating the signal wirelessly to the first and second portions, respectively. With the first and second antennae, the wire is electromagnetically coupled to the first and second portions, respectively.

In one embodiment of the present invention, the apparatus further comprises: (1) a plurality of antennae oriented in different directions within the anechoic chamber and (2) an antenna selection circuit for alternatively coupling the one end of the wire to one of the plurality of antennae. As those of skill in the art understand, the range of wireless communication is affected by the relative orientation of the transmitting and receiving antennae. The present invention contemplates multiple antennae to allow the device to be range-tested at differing degrees of relative antenna orientation. Most often, users of the devices place their (conventionally monopole) antennae in either a vertical or horizontal orientation. In this embodiment, the present invention advantageously places both vertical and horizontal antennae within the first anechoic chamber.

In one embodiment of the present invention, the signal modification circuit is a computer-controlled attenuation circuit, the apparatus further comprising a control computer for controlling the attenuation circuit to attenuate the signal by the selectable quantity. Computer control allows the process of range-testing the device to be fully automated. Once one or more first portions are isolated within the first anechoic chamber, the control computer can take over, perhaps automatically providing electrical power to and initializing the device(s), generating modulation energy to create simulated traffic on the signal, simulating a progressive distance separation of the first and second portions and analyzing the modulation energy (including bit error rate) to determine the strength of the signal as a function of the distance and, therefore, the range of the device.

In one embodiment of the present invention, the apparatus further comprises a second anechoic chamber for containing the second portion and the opposite end of the wire and substantially electromagnetically isolating the second portion from the first portion. The broad scope of the present invention requires only one anechoic chamber, which can contain either the first or second portion of the device. However, more isolation and therefore better range-test results may be obtained in some applications from employing two anechoic chambers, one for each of the first and second portions.

In one embodiment of the present invention, the anechoic chamber is adapted to contain a plurality of first portions of a plurality of cordless communication devices, the apparatus thereby capable of range-testing all of the plurality of cordless communication devices without opening the anechoic chamber. As described above, the present invention is advantageously employable to range-test a number of devices sequentially, in a batch. This lends more efficiency to the process of range-testing.

In one embodiment of the present invention, the anechoic chamber(s) contain an electromagnetically absorptive material to attenuate reflections of the signal within the first and second anechoic chambers, respectively. The electromagnetically absorptive material, while not necessary, reduces interference and generally improves range-test reliability.

In one embodiment of the present invention, the apparatus further comprises an acoustic generator and an acoustic analyzer that cooperate to generate and analyze acoustic energy transmitted via the portable portion, base portion and wireless channel. The acoustic generator and acoustic analyzer provide objective measures as to signal quality with analog devices. Of course, subjective measures, such as a human conversation, may also be used.

Bit error rate may simply be measured with digital devices. Therefore, in one embodiment of the present invention, the apparatus further comprises a bit error rate analyzer that analyzes a bit error rate encountered with the cordless telephone as a function of the distance.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
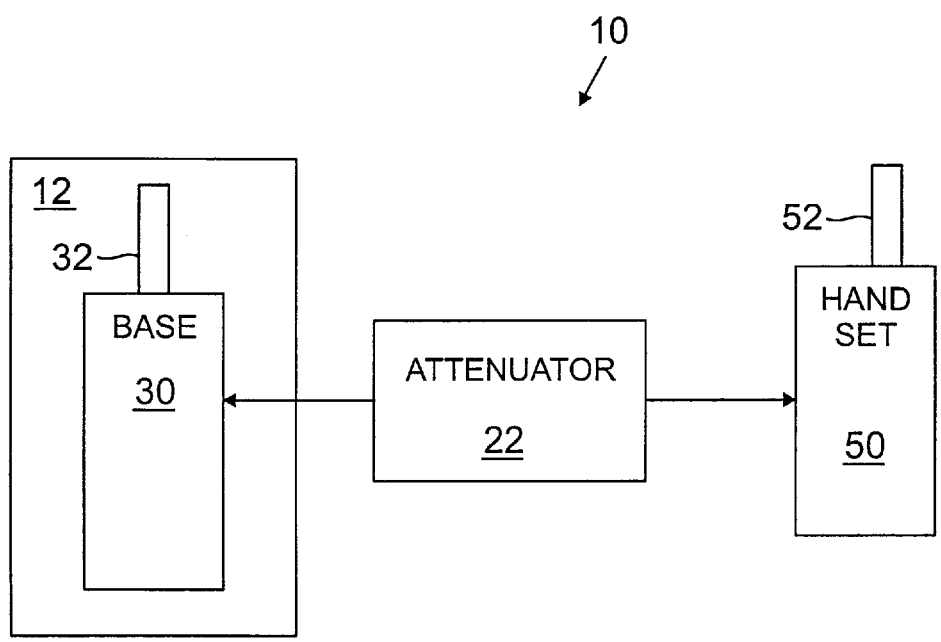
FIG. 1 illustrates a test fixture in accordance with one embodiment of the present invention.

FIG. 1 illustrates a test apparatus 10 according to one embodiment of the present invention. Test apparatus 10 comprises anechoic chamber 12 for containing base 30 of a cordless telephone set and substantially electromagnetically isolating base 30 from handset 50. Wire 21 carries an RF signal from base 30 to handset 50. One end of wire 21 terminates in anechoic chamber 12 proximate base 30 and the opposite end of wire 21 terminates proximate handset 50. In a preferred embodiment, the ends of wire 21 terminate close to antenna 32 of base 30 and antenna 52 of handset 50. Wire 21 passes through signal attenuator 22, which applies a variable amount of attenuation to the RF signal carried on wire 21. By varying the amount of attenuation of the RF signal, attenuator 22 simulates attenuation of the electromagnetic signal propagation as a function of distance separating base 30 and handset 50. This allows the cordless telephone set to be range-tested without actually varying the distance between handset 50 and base 30.

Figure 2:
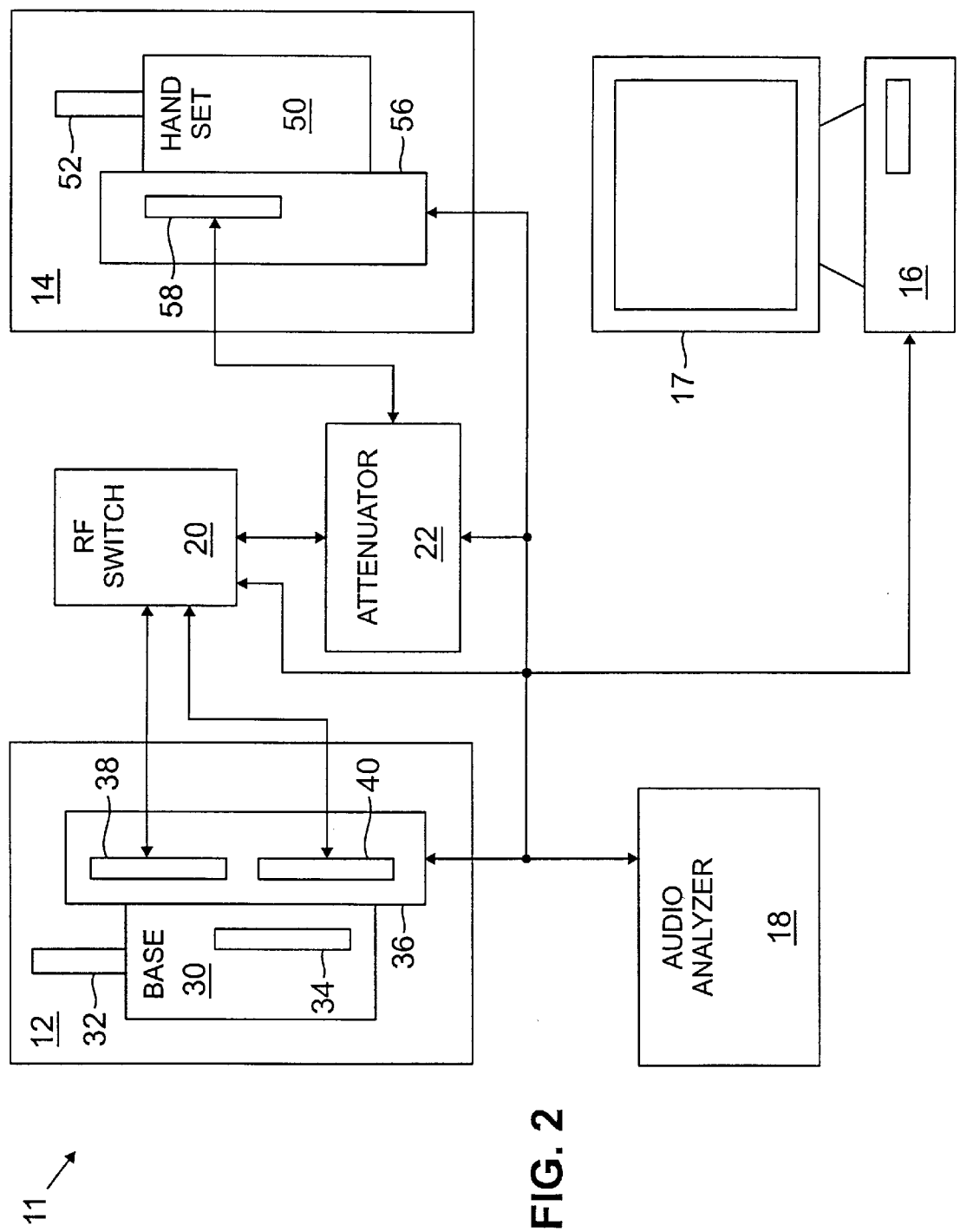
FIG. 2 illustrates a more detailed schematic of a test fixture in accordance with another embodiment of the present invention.

FIG. 2 illustrates a more detailed depiction of a test apparatus 11 according to one embodiment of the present invention. Test apparatus 11 comprises anechoic chamber 12, anechoic chamber 14, RF switch 20, attenuator 22, audio analyzer 18, computer 16 and monitor 17. As will be explained below in greater detail, anechoic chambers 12 and 14 provide isolation for base 30 and handset 50 of a cordless telephone set from both external interference and self-generated interference. Anechoic chamber 12 houses base test fixture 36, on which base 30 of the cordless telephone set is mounted. Anechoic chamber 14 houses handset test fixture 56, on which handset 50 of the cordless telephone set is mounted. Test fixtures 36 and 56 provide mating connectors for base 30 and handset 50. Base 30 includes two antennas for transmitting to and receiving from handset 50: external main antenna 32 and internal diversity antenna 34. Handset 50 includes external antenna 52 for transmitting and receiving.

Main coupling antenna 38 of base test fixture 36 provides a wireless connection with main antenna 32 for the transmission and reception of signals to/from handset 50. Similarly, backup coupling antenna 40 of base test fixture 36 provides a wireless connection with diversity antenna 34 for the transmission and reception of signals to/from handset 50. Test apparatus 11 uses the "near field" measurement approach to evaluate base 30 and handset 50. This means that each coupling antenna is located within the near field of either main antenna 32 or diversity antenna 34 in order to receive a strong signal with little loss. The near field region (or evanescent region) is where the electromagnetic energy of the signal is strongest and the multipath is minimum. For frequencies in the 900–928 MHZ range, main coupling antenna 38 and backup coupling antenna 40 are located within one inch of main antenna 32 and diversity antenna 34, respectively.

In a typical digital telephone handset, main antenna 32 of base 30 is a dipole antenna approximately six inches in length. Diversity antenna 34 is typically a six inch dipole printed antenna. Diversity antenna 34 is used as a backup antenna. When the signal at main antenna 32 is weak or noisy because of multipath problems or structural metal in the building in which the cordless telephone is located, diversity antenna 34 is used to transmit and receive in order to extend the RF range of the cordless telephone.

Main coupling antenna 38 and backup coupling antenna 40 are coupled to RF switch 20 by shielded coax cables. RF switch 20 operates under the control of computer 16 and is used to select between the coupling antennas in anechoic chamber 12. RF switch 20 is coupled to attenuator 22 by a coax cable. Attenuator 22 is in turn coupled by coax cable to coupling antenna 58 in anechoic chamber 14. Handset coupling antenna 58 of handset test fixture 52 provides a wireless connection with handset antenna 52 for the transmission and reception of signals to/from base 30. Thus, a complete circuit connection may be established from handset coupling antenna 58 to either main coupling antenna 38 or diversity coupling antenna 40, depending on the position of RF switch 20.

Computer 16 and monitor 17 are used to control and automate the testing of cordless telephones. Computer 16 applies power to base 30 and handset 50 through base test fixture 36 and handset test fixture 56. Computer 16 also downloads security codes to the microprocessors in base 30 and handset 50 in order to establish an RF communication link between base 30 and handset 50 through the coupling antennas. Once the RF communication link is established, computer 16 causes attenuator 22 to increase the signal attenuation in incremental steps within a specified range from a minimum of 1 dB to a maximum of 127 dB in order to simulate increasing distance between handset 50 and base 30. Computer 16 contains signal generating circuitry for sending a digital or analog test signal to either base 30 or handset 50 through the respective test fixtures. The test signal is then transmitted by base 30 to handset 50 or vice versa. Computer 16 also contains measuring circuitry for measuring the received signal at the receiving device. The received signal is downloaded to computer 16 by the corresponding test fixture of the receiving device.

The quality of the signal between handset 50 and base 30 may be measured by a variety of methods. For example, for an analog cordless telephone device, computer 16, or audio analyzer 18, may input a 1 KHz test signal to base 30 through base test fixture 36. Alternatively, the 1 KHz test signal may be internally generated by base 30. Base 30 then transmits the test signal through either diversity antenna 34 or main antenna 32 on a carrier frequency of, for example, 49 MHZ. The carrier frequency is picked up by a corresponding coupling antenna and routed through RF switch 20 to attenuator 22. The signal is then attenuated by a specified amount before being sent to coupling antenna 58 in anechoic chamber 14. The received signal is demodulated by handset 50 and the 1 KHz test signal is then sent through handset test fixture 56 to the measuring instruments in computer 16.

Although the test procedure described above uses base 30 to transmit a test signal to handset 50, it should be understood that computer 16 may instead send a 1 KHz test signal to handset 50 through handset test fixture 56, thereby causing handset 50 to transmit the test signal to base 30. The received signal is then demodulated by base 30 and the 1 KHz test signal is sent through base test fixture 36 to computer 16 for further processing.

Computer 16 may measure any parameter of the test signal, including amplitude, frequency, signal-to-noise ratio (SNR), etc. Once the signal degrades below a predetermined value, such as a threshold SNR level, as a result of computer-controlled attenuation, handset 50 and base 30 are determined to be "out of range" of one another (although neither has been moved). The amount of attenuation at that point is then translated into a corresponding physical distance by computer 16. If the physical distance is below the rated specification for the cordless telephone, the cordless telephone set is faulted.

Testing apparatus 11 may also be used to test digital cordless telephones. Computer 16 downloads security codes to base 30 and handset 50 in order to enable the transmission of signals between the two units. This ensures that base 30 and handset 50 are shipped as a matched pair when test apparatus 11 is used in final testing before shipping production units from the manufacturing facility. In response to the downloading of the security codes, either base 30 or handset 50 (depending on which is selected by computer 16) transmits a digital test signal to its counterpart unit. The digital test signal may be internally generated by the transmitting unit or may be eternally provided by audio analyzer 18. As in the case of an analog signal, computer 16 increase the attenuation of the transmitted signal in incremental amounts using attenuator 22 in order to simulate increasing distance. The receiving unit (either base 30 or handset 50) then downloads the received attenuated signal to computer 16 through the corresponding test fixture. Computer 16 may then measure the same parameters as stated above for an analog signal. Since the transmitted data is digital, computer 16 may also determine the bit error rate (BER) at the receiver in order to determine the quality of the received signal.

Anechoic chambers 12 and 14 provide RF isolation for testing base 30 and handset 50. The interior of each anechoic chamber is insulated with an RF absorptive material to eliminate both internal and external interference signals. For digital cordless telephones operating in the 900–928 MHZ range, the absorptive material is a laminated absorber about 4.5 inches thick. External interference signals, which are attenuated by both the walls of each chamber and the absorptive material, can be caused by electronics in the manufacturing facility, particularly other base and handset pairs that are simultaneously being tested. Internal interference signals can be caused by multipath reflections off the chamber walls, but are instead absorbed by the laminated absorber.

Figure 3:
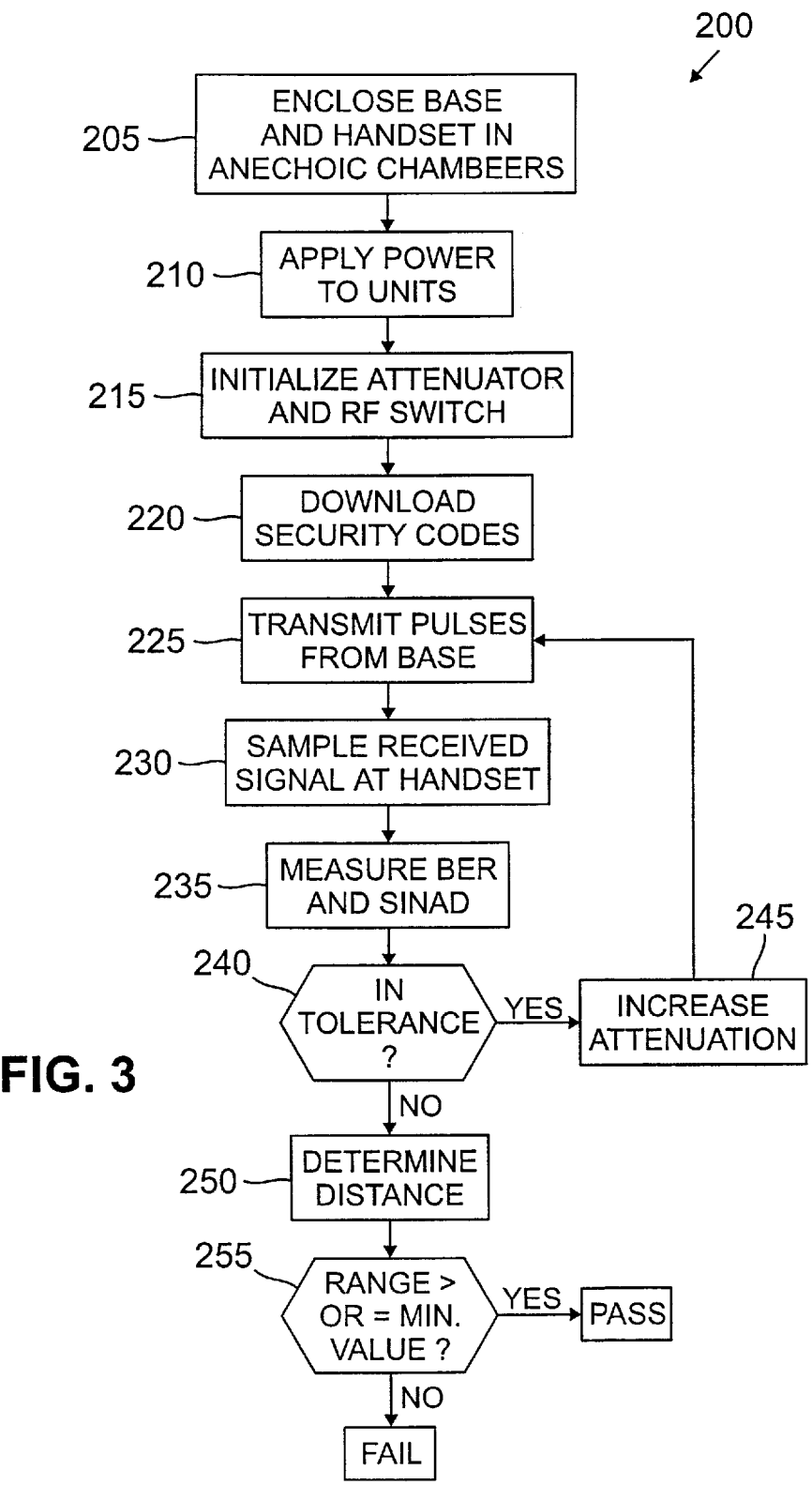
FIG. 3 illustrates a flowchart for implementing a range testing procedure using a test fixture in accordance with one embodiment of the present invention.

FIG. 3 illustrates a flowchart 200 for a test procedure for determining the range of base 30 and handset 50 using test apparatus 11 in accordance with one embodiment of the present invention. After isolating base 30 and handset 50 in the two anechoic chambers (Step 205), power is applied to both units (Step 210). Next, attenuator 22 is initialized to a minimum attenuation and RF switch 20 is positioned to select either main coupling antenna 38 or diversity coupling antenna 40 in test fixture 36 (Step 215). Computer 16 then downloads security codes to handset 50 and base 30 and the unit selected to transmit sends pulses to the receiving unit (Steps 225 and 230), The receiving unit captures the transmitted signal and the data is downloaded to computer 16 (Step 235). Computer 16 next measures the bit error rate (BER) and one or more other parameters, including signal-to-noise ratio and distortion (SINAD). If BER and SINAD (or other parameter) are within tolerance, computer 16 increases attenuation using attenuator 22 (Steps 240 and 245) and transmission and measurement of pulses continues (Step 225–235). However, when BER, SINAD or another selected parameter finally falls below a minimal threshold, computer 16 detects that base 30 and handset 50 are out of range of one another and determines a distance corresponding to the current attenuation setting (Step 250). This distance is compared to the minimum acceptable range for a cordless telephone and the cordless telephone under test is faulted if below the minimum range (Step 255).

In an alternative test procedure, the step-by-step incrementing of attenuation may be bypassed by simply setting attenuator 22 to an attenuation equal to the minimum acceptable range and determining whether the received signal is within tolerance.

Although the present invention has been described in detail, those skilled in the art should understand that they can make various changes, substitutions and alterations herein without departing from the spirit and scope of the invention in its broadest form.

What is claimed is:

1. An apparatus for range-testing a cordless communication device, said device having a first portion adapted to communicate with a second portion via a signal carried on a wireless channel, said signal subject to attenuation as a function of a distance separating said first and second portions, said apparatus comprising:
   an anechoic chamber for containing said first portion and substantially electromagnetically isolating said first portion from said second portion;
   a wire for carrying said signal between said first and second portions, one end of said wire locateable within said anechoic chamber proximate said first portion and an opposite end of said wire locateable proximate said second portion; and
   a signal modification circuit, associated with said wire, for changing an amplitude of said signal by a selectable quantity, said signal modification circuit simulating said distance between said first and second portions thereby to allow said cordless communication device to be range-tested without actually varying said distance.

2. The apparatus as recited in claim 1 wherein said first portion is a base portion adapted to be coupled to a wire-based telecommunication system.

3. The apparatus as recited in claim 1 wherein said one and opposite ends of said wire are coupled to first and second antennae for communicating said signal wirelessly to said first and second portions, respectively.

4. The apparatus as recited in claim 1 further comprising:
   a plurality of antennae oriented in different directions within said anechoic chamber; and
   an antenna selection circuit for alternatively coupling said one end of said wire to one of said plurality of antennae.

5. The apparatus as recited in claim 1 wherein said signal modification circuit is a computer-controlled attenuation circuit, said apparatus further comprising a control computer for controlling said attenuation circuit to attenuate said signal by said selectable quantity.

6. The apparatus as recited in claim 1 further comprising a second anechoic chamber for containing said second portion and said opposite end of said wire and substantially electromagnetically isolating said second portion from said first portion.

7. The apparatus as recited in claim 1 wherein said anechoic chamber is adapted to contain a plurality of first portions of a plurality of cordless communication devices, said apparatus thereby capable of range-testing all of said plurality of cordless communication devices without opening said anechoic chamber.

8. A method of range-testing a cordless communication device, said device having a first portion adapted to communicate with a second portion via a signal carried on a wireless channel, said signal subject to attenuation as a function of a distance separating said first and second portions, said method comprising the steps of:
   containing said first portion in an anechoic chamber, said anechoic chamber substantially electromagnetically isolating said first portion from said second portion;
   carrying said signal on a wire between said first and second portions, one end of said wire locateable within said anechoic chamber proximate said first portion and an opposite end of said wire locateable proximate said second portion; and
   changing an amplitude of said signal by a selectable quantity with an signal modification circuit associated with said wire, said signal modification circuit simulating said distance between said first and second portions thereby to allow said cordless communication device to be range-tested without varying said distance.

9. The method as recited in claim 8 wherein said first portion is a base portion adapted to be coupled to a wire-based telecommunication system.

10. The method as recited in claim 8 further comprising the step of coupling said one and opposite ends of said wire to first and second antennae for communicating said signal wirelessly to said first and second portions, respectively.

11. The method as recited in claim 8 further comprising the steps of:
    orienting a plurality of antennae in different directions within said anechoic chamber; and
    alternatively coupling said one end of said wire to one of said plurality of antennae.

12. The method as recited in claim 8 wherein said signal modification circuit is a computer-controlled attenuation circuit, said method further comprising the step of computer-controlling said attenuation circuit to attenuate said signal by said selectable quantity.

13. The method as recited in claim 8 further comprising the step of containing said second portion and said opposite end of said wire in a second anechoic chamber, said second anechoic chamber substantially electromagnetically isolating said second portion from said first portion.

14. The method as recited in claim 8 wherein said anechoic chamber is adapted to contain a plurality of first portions of a plurality of cordless communication devices, said method further comprising the step of range-testing all of said plurality of cordless communication devices without opening said anechoic chamber.

15. An apparatus for range-testing a cordless telephone, said device having a base portion adapted to communicate with a portable portion via a signal carried on a wireless channel, said signal subject to attenuation as a function of a distance separating said base and portable portions, said apparatus comprising:
    a first anechoic chamber for containing said base portion and substantially electromagnetically isolating said base portion from said portable portion and an environment surrounding said first anechoic chamber;
    a first antenna located within said first anechoic chamber proximate said base portion and having a first orientation;

a second anechoic chamber for containing said portable portion and substantially electromagnetically isolating said portable portion from said base portion and said environment;

a second antenna located within said second anechoic chamber proximate said portable portion and having a second orientation;

a wire, coupled between said first and second antennae, for carrying said signal therebetween;

a computer-controlled attenuation circuit, associated with said wire; and a control computer, coupled to said attenuation circuit, for controlling said attenuation circuit to attenuate said signal by varying numbers of decibels, said attenuation circuit simulating varying distances between said portable and portable portions thereby to allow said cordless telephone to be range-tested without actually varying said distance.

16. The apparatus as recited in claim 15 further comprising:

a third antenna located within said first anechoic chamber proximate said portable portion and having a third orientation different from said first orientation; and a computer-controlled antenna selection circuit, coupled to said wire and said control computer, for alternatively coupling said wire to said first and third antennae.

17. The apparatus as recited in claim 15 wherein said first and second anechoic chambers are adapted to contain a plurality of base portions and portable portions, respectively, of a plurality of cordless telephones, said apparatus thereby capable of range-testing all of said plurality of cordless telephones without opening said first and second anechoic chambers.

18. The apparatus as recited in claim 15 wherein said first and second anechoic chambers each contain an electromagnetically absorptive material to attenuate reflections of said signal within said first and second anechoic chambers, respectively.

19. The apparatus as recited in claim 15 further comprising an acoustic generator and an acoustic analyzer that cooperate to generate and analyze acoustic energy transmitted via said base portion, portable portion and wireless channel.

20. The apparatus as recited in claim 15 further comprising a bit error rate analyzer that analyzes a bit error rate encountered with said cordless telephone as a function of said distance.

* * * * *